United States Patent
Tsypliaev et al.

(10) Patent No.: US 7,603,533 B1
(45) Date of Patent: Oct. 13, 2009

(54) SYSTEM AND METHOD FOR DATA PROTECTION ON A STORAGE MEDIUM

(75) Inventors: Maxim V. Tsypliaev, Moscow (RU);
Maxim V. Lyadvinsky, Moscow (RU);
Alexander G. Tormasov, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 319 days.

(21) Appl. No.: 11/154,660

(22) Filed: Jun. 17, 2005

Related U.S. Application Data

(63) Continuation-in-part of application No. 11/016,727, filed on Dec. 21, 2004, and a continuation-in-part of application No. 10/624,858, filed on Jul. 22, 2003, now Pat. No. 7,246,211.

(51) Int. Cl.
*G06F 12/00* (2006.01)

(52) U.S. Cl. .................. 711/167; 711/114; 711/118; 711/151; 711/158; 711/203; 709/217; 709/219; 709/225; 709/229

(58) Field of Classification Search ........................ None
See application file for complete search history.

(56) References Cited

U.S. PATENT DOCUMENTS

| | | | |
|---|---|---|---|
| 5,537,595 A * | 7/1996 | Sakata .................... 718/105 |
| 5,649,152 A | 7/1997 | Ohran et al. |
| 5,835,953 A | 11/1998 | Ohran |
| 5,905,990 A | 5/1999 | Inglett |
| 6,618,736 B1 | 9/2003 | Menage |
| 6,665,815 B1 | 12/2003 | Goldstein et al. |
| 6,748,502 B2 * | 6/2004 | Watanabe et al. ............ 711/158 |
| 2003/0233647 A1 * | 12/2003 | Blaser et al. ................. 717/174 |
| 2006/0259949 A1 * | 11/2006 | Schaefer et al. ................. 726/1 |

* cited by examiner

*Primary Examiner*—Sanjiv Shah
*Assistant Examiner*—Midys Rojas
(74) *Attorney, Agent, or Firm*—Bardmesser Law Group

(57) ABSTRACT

A method of and system for protecting a disk drive or other data storage includes mounting a virtual storage that combines a full access temporary storage and a READ-only portion of a main storage, wherein the READ-only portion represents a protected area of the main storage; generating a bitmap for blocks of the virtual storage; redirecting virtual storage write requests to the temporary storage; marking, in the bitmap, blocks of the virtual storage corresponding to blocks of the temporary storage that are being written to; redirecting, to the READ-only portion, read requests for unmarked blocks; redirecting, to the temporary storage, read requests for marked blocks; upon an acceptance of a state of the virtual storage, merging the temporary storage with unmarked blocks of the READ-only portion of the main storage, to form an integral storage; and upon a rejection of a state of the virtual storage, terminating the redirecting. Optionally, data in the temporary storage can be archived.

23 Claims, 6 Drawing Sheets

SYSTEM AND METHOD FOR DATA PROTECTION ON A STORAGE MEDIUM

CROSS-REFERENCE TO RELATED APPLICATIONS

This application is a Continuation-in-part of U.S. patent application Ser. No. 11/016,727, entitled SYSTEM AND METHOD FOR INCREMENTAL BACKUP OF LOCAL DRIVE DATA, filed on Dec. 21, 2004, and is a Continuation-in-part of U.S. patent application Ser. No. 10/624,858, entitled SYSTEM AND METHOD FOR USING FILE SYSTEM SNAPSHOTS FOR ONLINE DATA BACKUP, filed on Jul. 22, 2003, which are incorporated herein by reference in their entirety.

BACKGROUND OF THE INVENTION

1. Field of the Invention

The present invention relates to protecting computing systems from data and software faults, and more particularly, to fast restoration of the computing systems in case of data corruption as a result of software execution.

2. Related Art

With the popularity and success of the Internet, server technologies are of great commercial importance today. An individual server application typically executes on a single physical host computer, servicing client requests.

In conventional systems, the data of the server is typically backed up on some storage device in the form of backup files. If the server crashes or fails, or if the software becomes corrupted; it may become necessary to restore the state of the server to some previously backed-up state.

Usually the conventional process consists of three steps: (1) the machine is taken out of service; (2) the data is backed up to the backup storage, e.g., a disk drive, used by the server; and (3) the server is restarted. In case of a crash or failure, data is restored from the backup image, and the server is restarted.

Conventional methodology for restoring computing systems normally requires a full or partial backup of relevant data that may be corrupted or modified in the illegal manner, and then, in case of a crash, restoring that data from the backup. These procedures are generally fairly time- and memory-consuming, since two conversions of data are required in case of system fault.

Such procedures require a lot of downtime, since during the back up and restoration, the server is inoperable. This is inefficient, disrupts normal operations, and is usually unnecessary, given that the vast majority of the data on the local drive is frequently unaltered, notwithstanding the fact that the entire local drive is backed up.

In corporate networks, a typical server can have 100 Gigabytes (or, frequently, much more than that) of data. With a transfer rate of up to 100 Megabytes per second over a network, it would take approximately 1,000 seconds to transfer all the data from the backup storage to the server's local storage. This assumes that the entire network bandwidth is available for this process. Frequently, this is not the case, since only a fraction of the bandwidth may actually be available at any given time for restoring the files from backup. In practice, such transfers of data from backup to the server's local storage can take many hours.

Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, the consumer attention span is relatively short, and a customer that does not receive a rapid response from a web server will simply go to a competitor's website.

One of the problems that arise in the context of testing or running of a new software is protection or preservation of the contents of the hard drive (or some other storage medium) as of a particular point in time. For example, the hard drive may contain data and executable files at some particular time $t_1$ that is known to be "correct" (or valid in some sense) and virus-free. A user or a developer may wish to install additional software that does not have a presumption of validity, or a presumption of being virus free. Thus, the original disk contents at the time $t_1$ needs to be stored in some manner, so that, in the event that the new software is defective, or contains viruses, or corrupts the contents of the hard drive, the original contents of the hard drive at the time $t_1$ can be rapidly restored at the time $t_2$, assuring continuity and system functionality.

Therefore, there is a need in the art for an efficient and fast data restoration to a pre-defined restoration point, as well as for a more efficient method of restoring data of a computer system. Also, there is a need to be able take a snapshot of a hard drive, and to be able to restore the condition of the system to the contents of the snapshot with minimum overhead and as rapidly as possible.

SUMMARY OF THE INVENTION

The present invention relates to a system and method for storage medium data protection that substantially obviates one or more of the disadvantages of the related art.

More particularly, in an exemplary embodiment of the present invention, a method of and system for protecting a disk drive or other data storage includes mounting a virtual storage that combines a full access temporary storage and a READ-only portion of a main storage, wherein the READ-only portion represents a protected area of the main storage; generating a bitmap for blocks of the virtual storage; redirecting virtual storage write requests to the temporary storage; marking, in the bitmap, blocks of the virtual storage corresponding to blocks of the temporary storage that are being written to; redirecting, to the READ-only portion, read requests for unmarked blocks; redirecting, to the temporary storage, read requests for marked blocks; upon an acceptance of a state of the virtual storage, merging the temporary storage with unmarked blocks of the READ-only portion of the main storage, to form an integral storage; and upon a rejection of a state of the virtual storage, terminating the redirecting. Optionally, data in the temporary storage can be archived.

Optionally, multiple temporary storages can be used to create multi-branched storage structure. Different virtual storages based on a single drive (main storage) can be used, if desired, for updating the main storage device that is simultaneously used by different applications, using a plurality of temporary storages with concurrent access to the main storage, while updating a plurality of virtual storages. The different applications can run in different operating environments. The blocks of the temporary storage can be "write-once-read-many times" blocks.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 4:
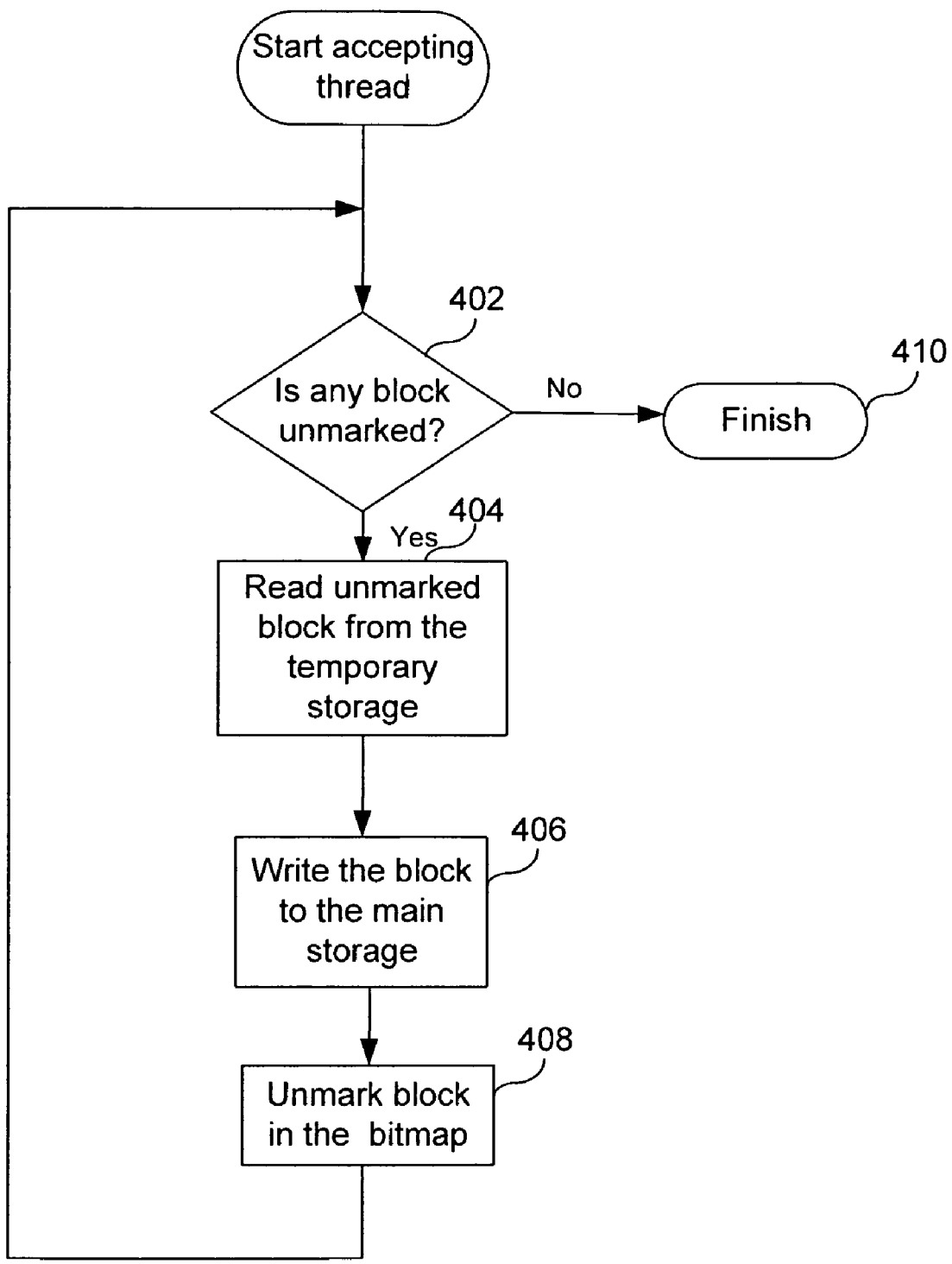

FIG. 4 describes the process of transferring data when all the changes are made final.

Figure 5:
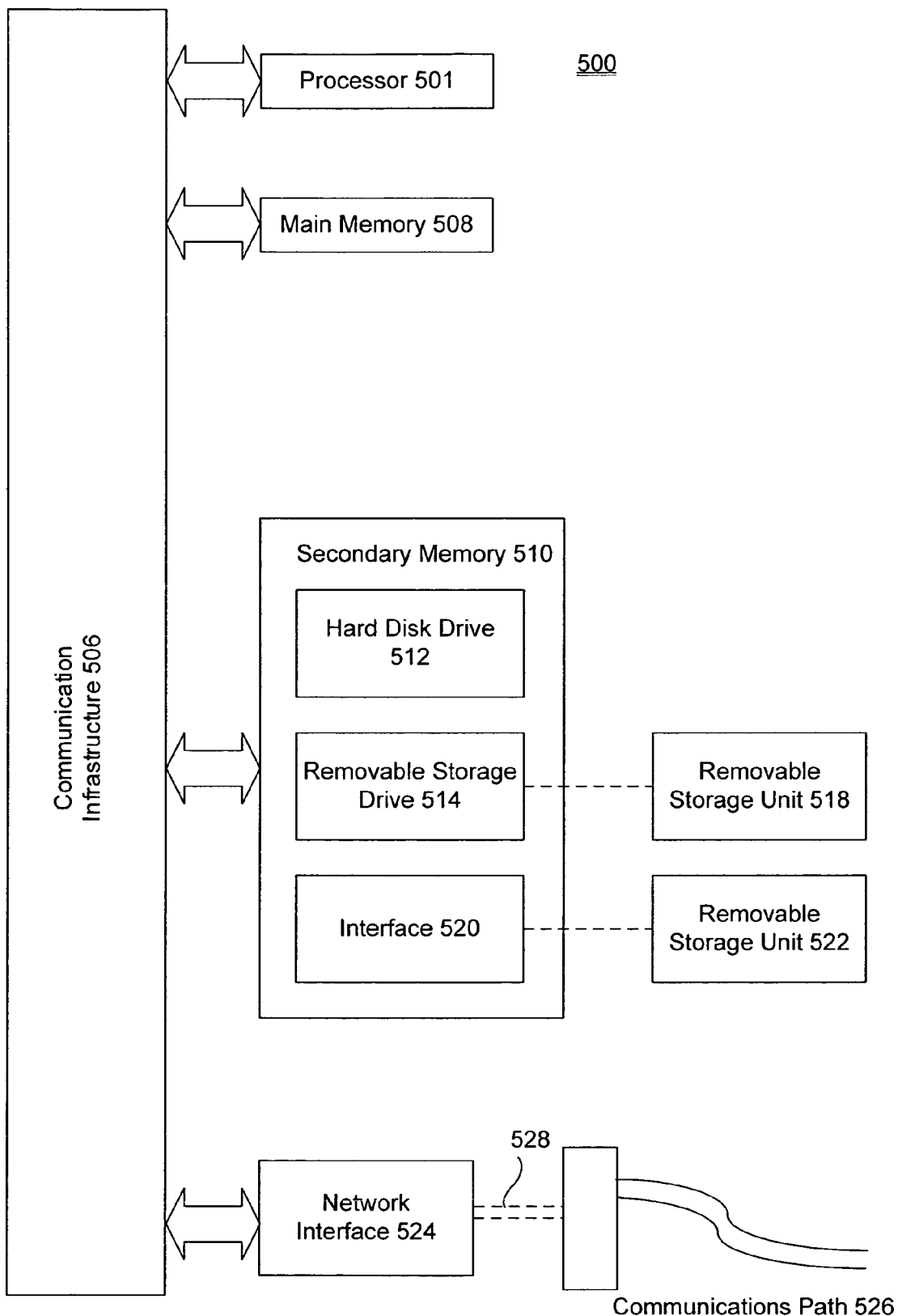

FIG. 5 illustrates an example of a computing system that may be used in the invention.

DETAILED DESCRIPTION OF THE INVENTION

Reference will now be made in detail to embodiments of the present invention, examples of which are illustrated in the accompanying drawings.

The present invention is related to a utility for server restoration or data protection that works on a data block level, where "blocks" can mean data blocks themselves, such as disk sectors, or clusters or similar aggregates of blocks. It should be understood that although the term "hard drive" or "hard disk drive" (HDD) is commonly used, the actual storage medium at issue does not need to be an entire disk drive (or even a disk drive as such). It can be a logical drive, a flash disk, a partition of a disk drive assigned to a particular server, or a partition assigned to a particular virtual private server. It can also be a network drive or a portion of a network drive, or it can be a distributed storage system that acts as a single logical drive. However, from the perspective of an operating system, a device exists and acts analogously to a hard disk drive that can be accessed using device drivers. Furthermore a server is only an example of the computing system where the invention may be used. Other hardware systems, such as desktops or mobile computers can use the invention.

Here and afterwards, "critical applications" refers to OS and user applications running on the server or computing system, as well as to applications that can cause a failure not by their nature, but as a result of a user's actions, such as deletion of files or changing system or other settings.

The proposed approach is designed to protect a computer system from crashes or failures, for example, in the context of testing new software for functionality and compatibility issues, as well as for any operation when virus infection is a possibility, or when using other software perceived as a possible threat. The proposed approach can also be used when a single initial state of a hard drive, or other storage devices, or parts of storage devices, is used by multiple operating systems on the same or different computers. Also, the proposed approach can be used for storing different states of the storage units with the same initial state.

The discussion herein is therefore primarily directed to the interaction between two elements:

(a) a protected area of the main storage (in the discussion below, "protected area"), which represents a data structure at a defined point in time; and (b) a temporary, or intermediate, storage (in the discussion below, "temporary storage" or "temporary data storage") (in effect, a buffer with random access) that records additions and changes to the data structure, initially represented by protected area so that user applications can read the unchanged blocks from the protected area, and changed (or newly written) blocks from the temporary storage. (Note that user applications normally read and write blocks via system drivers, and not directly).

The present approach protects the data of a hard drive by activating a special redirection driver for read and write requests (or any other disk access requests that alter the contents of the data), so that write requests are redirected to the temporary storage. This process is transparent to the user application, although the user can be provided with an indicator (such as an on-screen icon) informing the user that the data protection system has been activated, and that all write requests are redirected elsewhere.

The redirection driver decides whether the access request needs to be addressed to the temporary storage, or to the protected area. Normally, a read request is intercepted by the redirection driver and addressed either to the protected area or to the temporary storage if the particular data block has been altered, or changed, or created, since a time $t_1$, where $t_1$ is the time when a protection procedure was started. If the data block in the virtual storage has not been changed from $t_1$, then that data will be read from the protected area.

The redirection driver intercepts and redirects all write requests to the temporary storage. Similarly, all requests to delete a data block or to create a new file (i.e., a collection of data blocks) will be executed by utilizing the temporary storage. For example, deletion of a file may be reflected in blocks of the temporary storage corresponding to the blocks of file description structure (or other logical objects) of the virtual drive. Such a descriptor can be stored in a file allocation table (FAT), or a master file table (MFT) in of the terminology of DOS or Windows® family operating systems, or inode in UNIX file systems, or similar structures. For simplicity, here and afterward, descriptors used in file systems will be called file allocation table, or FAT.

It should be noted that the redirection driver preferably works on a physical address level that is below the file level, in other words, on a data block level. Furthermore, the process can be performed in an online manner, in other words, it can be a background process.

At some point (time $t_2$), the user has the option of deciding whether to accept the changes, or to return to the original system state, as of the time $t_1$. In the event that the user decides to reject, or drop, the changes (for example, if the software that he is testing is "buggy," or does not perform as expected, or causes system crashes, etc.), then, through a simple interface (such as an on-screen icon or button), the user can "reject" the changes, which means that the redirection driver will no longer redirect any requests to the temporary storage. Going forward, all the access requests will be directed to the blocks of the area previously being protected, creating the effect of restoring the system state as of the time $t_1$ in minimal time (due to the fact that all that needs to change is the operation of the redirection driver).

In the event that the user decides to accept the state of the system at the time $t_2$ as the "real" state of the system, the user can do so by starting a dedicated utility that merges the protected area and the temporary storage to form a new state of the main storage that corresponds to the virtual storage. Such a dedicated utility can be started e.g., using a graphical interface such as through an icon or button on a screen or monitor. This tells the redirection driver that the data in the temporary storage should be treated as "valid" data going forward. Also, the data in the temporary storage needs to be restored as valid data in the main storage. This can be done online (as a background process), such that to, a user, no discontinuity is apparent. The system can therefore copy, merge or otherwise accepts the required blocks from the temporary storage to the main storage as a background process. After that, the redirection aspect of the driver can be deactivated. Once the copying is completed, the data of the main storage will be treated as the "real" data, and at least some of the contents of the temporary storage can be ignored. While the process of accepting changes is performed, the redirection process should preferably stay active.

One way to implement the redirection driver is through the use of a bitmap and a database that contains a set of translations, or links, to the locations of the relevant data blocks. For example, the bitmap can have a bit or flag corresponding to each data block in the main storage, where, e.g., a "0" in the particular bit of the bitmap can represent the fact that the data in that data block has not been change since the time $t_1$. A "1" therefore could represent the fact that the data of that data block has been changed (or vice versa). In the event that it has been changed, the database contains a link to the physical address at which the modified data block can be found.

Another way to view this is to consider the bitmap as an indicator of the validity of the links in a database. A "0" bit in the bitmap means that the link is not valid, while a "1" in the bitmap means that the link is valid (or vice versa, as desired by the particular developer). Resetting the bitmap to zero is functionally analogous to dropping all changes. At the same time, there is no need to clear memory areas that store links. During the process of accepting the changes to the data reflected in the temporary storage, the bits in the bitmap are reset once the data block at issue has been copied from the temporary storage to the area that was previously protected, or to another block of the main storage, or have been merged to the main storage by other way.

This approach allows for a very rapid restoration of the system state to a particular "protected state" (i.e., the state of hard drive as of the time to), since all that needs to be done is to disable the redirection feature of the disk driver. This, in turn can be accomplished in any number of ways, for example, by resetting all the bits and the bitmap to zero, or by disabling the checking of the bitmap, or by simply recalling the "standard" system driver for that particular peripheral (i.e., for that particular type of storage, such as hard disk drive or flash drive). Thus, the restoration of the system state to the time $t_1$ can be accomplished practically instantaneously, and the user has the option to accept the changes or to reject the changes.

The temporary storage can be implemented in number of ways. It can be another partition of the same physical drive (local drive) as the main storage, or a different physical hard drive, a network drive, a collection of drives, a DVD-RAM, a RAM (e.g., a flash disk), or it can share a partition or a drive with the protected part of the storage device, etc. In the latter case, free blocks of the partition can be assigned to the temporary storage, e.g., in succession or simultaneously with starting the protection procedure.

Also, the temporary storage can be implemented in any other manner in which data storage is implemented, such that it can be addressed on a block level, as is known in the art. The temporary storage can be formed from a combination of data blocks of the main drive and data blocks of an external drive. The temporary storage can be physically located, for example, on a network drive, on an element of a storage area network, can be part of the main drive, or on an area of a main drive specifically reserved (dedicated) for the temporary data storage. The protected area can be the entire main drive (main data storage), or a portion of the main drive, or some subset of sectors or clusters of the main drive.

In one embodiment, virtual storage is mounted (i.e., made available to the OS) for example, by updating a device driver for the main storage, or by updating or changing or replacing its component(s), or by replacing the device driver, or by otherwise changing its behavior, e.g., by adding a filter to the device driver) for providing protecting and restoring the HDD without significant downtime. Virtual storage is a combination of two storages: the protected area of the main drive and the temporary data storage. (Note that "virtual storage" is a logical construct of convenience—the actual hardware does not change, the only thing that changes is how the various hardware elements are handled.) The protected area can include contents of a hard disk drive (HDD), a file structure together with the files' data, or any other data set that has internal order. The second part of the virtual storage is the temporary storage, where changes of the virtual storage are reflected. Thus, changes or edits to the files or other data structures in the main drive being affected by a user applications or system utilities can be registered and handled in the virtual storage as if it were real storage.

The main data storage of the computing system, such as a server, is thus protected, and stays unchanged in the relevant part or during execution of applications that can cause a critical failure during (or as a result of) execution.

The temporary storage reflects contents of blocks of the main data storage that have to be changed or overwritten during execution of the critical applications.

The virtual storage can be embedded in OS address space to represent the main data storage. Note also that the virtual storage blocks exist at the lowest logical level being accessed by the OS, e.g., at the level of clusters or sectors where available. Note that working with the virtual storage requires appropriate drivers, for example, by updating, changing, replacing or otherwise modifying behavior of standard drivers to act as custom (dedicated) drivers.

The virtual storage can represent a fill drive, or a drive partition (in the Windows operating system, designated by a different letter), a folder in the file system, or a single file, or represented by a block that can be modified separately, e.g., a database. Note that data handling is performed on a block level, while the main data storage, i.e., totality of blocks being protected, may be defined at a higher logical level. In UNIX, a virtual data set can be mounted by creating a mount point accessible in a common name space.

It should be noted that the approach to mounting a virtual storage for files, folders or disk portions described above ensures correct and reliable operation of all system processes and user applications, to the extent that they use data stored in the virtual storage device. A virtual storage that is being mounted or otherwise created is automatically recognized by the system applications as if it were an integral structure.

In one embodiment, the blocks are created in the temporary storage "on-the-fly", for single writing and all the changes of the virtual storage are reflected in the temporary storage. In this case, allocations of the blocks with the latest version only can be reflected together with the bitmap.

The updating of the main storage (e.g., after closing critical applications) can be done, for instance, as a background process, by copying data from the temporary data storage to the main storage, as described in related application Ser. No. 10/925,928; Filed: Aug. 26, 2004, entitled: SYSTEM AND METHOD FOR USING FILE SYSTEM SNAPSHOTS FOR ONLINE DATA BACKUP, which is incorporated by reference herein in its entirety.

Figure 1A:
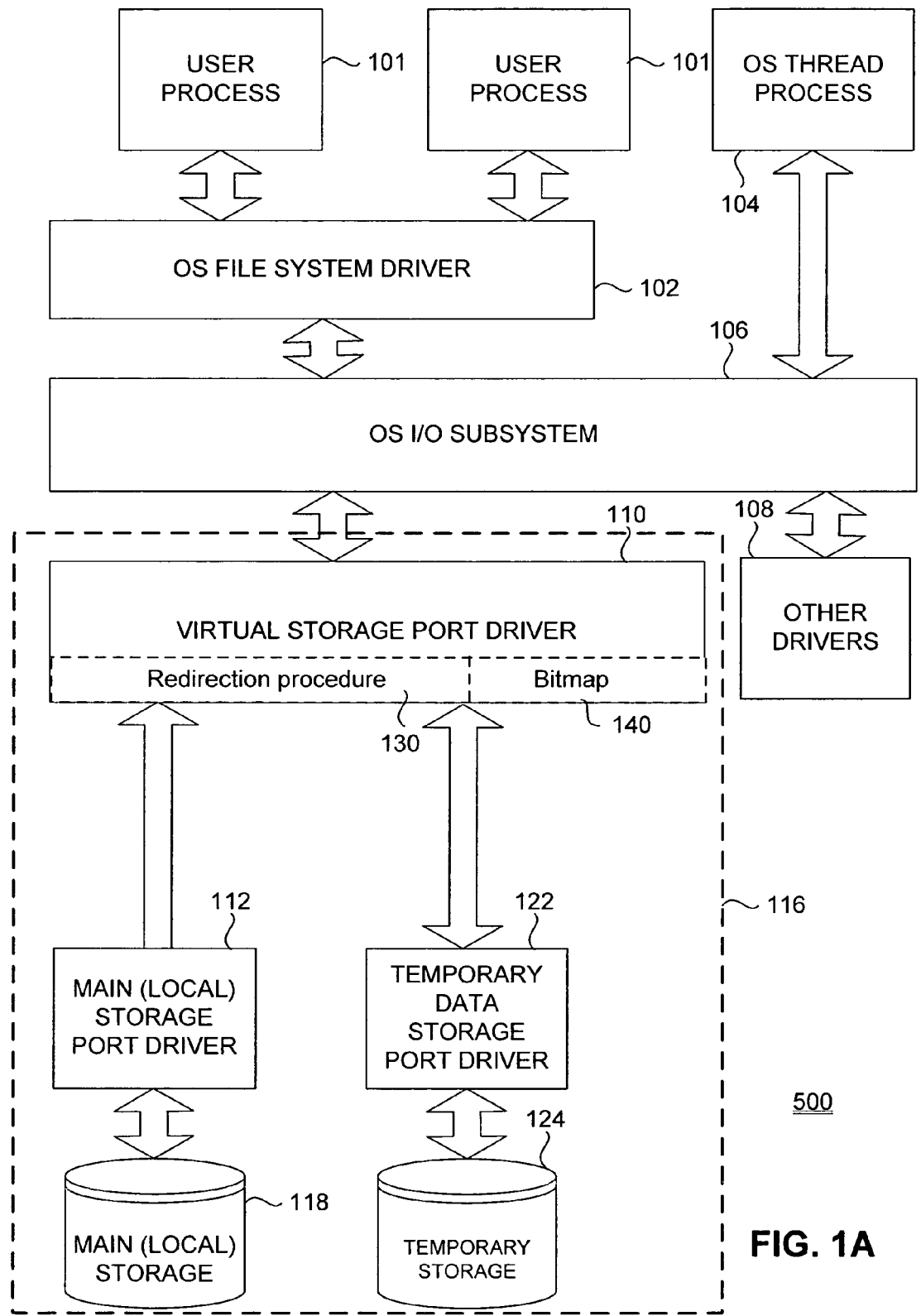
FIG. 1A illustrates an example of a data processing model when a protected mode is in effect.

FIG. 1A shows a data processing diagram in a computing system 500 that has a protected main storage structure. The computing system 500 supports execution user processes 101 executing in an OS environment having a file system driver 102. Also, one or more OS thread processes 104 may be executed in parallel with user processes. Such OS processes also can modify data represented on the main storage (main data storage). An OS I/O subsystem 106 is in communication with the file system driver 102. The I/O subsystem 106 uses a class driver to manage and deliver I/O requests to device drivers 112 and 122, that provide communication to corresponding devices: I/O ports (not shown), local area network controllers (not shown), main data storage 118 and temporary data storage (temporary storage) 124, e.g., local data storage (such as flash drives or hard disk drives, or drive partitions or folders), etc. Temporary data storage 124 and its driver 122 are used for storage of data being generated by processes that write data to the virtual storage 116 and for subsequent reading of data that had been previously written. For better illustration, the main storage 118 is represented on the FIG. 1A being fully protected. In other words the main storage 118 corresponds to the protected area. In some embodiments, the main data storage 118 can have a protected area with read only access and an unprotected area, including temporary storage with random access.

Requests to a virtual storage 116 can be managed by means of dedicated driver (virtual storage driver) 110 that addresses data corresponding to access requests via corresponding storage ports by use of storage port drivers 112 and 122, selected based on a result of bitmap 140 checking. It should be noted that the two storage port drivers 112 and 122 can be the same storage port driver if the protected area of the main data storage 118 and the temporary data storage 124 share the same physical drive, even if the main data storage 118 and the virtual storage are located on different partitions of the same drive (including a distributed storage drive, such as a RAID or a network drive or a partition that shares the HDD with the main drive). The virtual storage port driver 110 is used to intercept access requests to the main storage, as well as for organizing the virtual storage 116 (its components are shown as single structures, although they can be multiple storage elements). The virtual storage driver 110 therefore includes a redirection procedure 130 that references the bitmap 140 shown, for example, as a part of the virtual storage driver.

The main data storage 118 is "frozen" at some predefined point in time $t_1$. In the virtual storage 116, all WRITE requests should be addressed to the temporary data storage 124, instead of to the main data storage 118.

Protected area (main storage 118) and temporary data storage 124 are hidden from the I/O subsystem 106 as separate storage areas, and their content is accessed by the I/O subsystem 106 as having an integral (unified) address space (including handling any issues with access requests for nonexistent data or files). Also, the protected area of the main storage 118, when the data protection mode is activated, can be accessed for READ-only access, while the temporary data storage 124 is generally random access storage. Write-once-read-many blocks device can also be used as a temporary storage device, where all the changes to the main data storage 118 are recorded, and then the latest version of the edited data blocks may be read on demand.

In case of an unsafe event (e.g., a crash or failure), the virtual storage port driver 110 and all associated data can be removed (or discarded). In this case, the system 500 returns to its initial state at once, without time delay. After emergency completion of the applications that are running (or in case of restoring, of the initial state of the main data storage 118), and removal of the virtual storage driver 110 (or its component, such as the bitmap 140) from the OS, the I/O subsystem 106 manages requests to main data storage 118, and, if needed, to the temporary data storage 116 directly, by means of local port driver 112. When the main data storage 118 contains OS data, the server 500 should be rebooted concurrently with or after removing virtual storage port driver 110.

After closing all the critical applications (or at any other point in time, defined by the user), the data and the changes can be accepted by copying blocks from the temporary data storage 124 to corresponding blocks of the main data storage 118 as a background process with minimal downtime. Although the process of accepting the data (120) in response to a user command is performed in the background, it can also be performed as a process with the higher priority level or in a single process mode.

Also, data and the changes can be accepted by updating description of the logical structure of the main storage 118, such that blocks of the temporary data storage 124 are now identified as main data storage 118 blocks.

On the other hand, in case of failure or a critical error, all the data in the temporary data storage 124 can be dropped at once, and the server 500 can restart in its previous state, without requiring the time to restore the server 500 from the backup.

Also, data from the temporary data storage 124 can be saved, in order to form a backup increment for restoring the computing system 500 to a state at some selected point of time. Furthermore, part of the temporary data storage 124 can be "frozen" to create an additional restore point. In this case, two or more parts of the temporary data storage 124 can be treated as described earlier. Thus, a plurality of restore points can be established.

Also, a number of temporary storages may be created, to form a plurality of virtual data storages (for example, drives with different letters).

Once the unsafe application process has been completed, and all the changes have been accepted by the user, a data acceptance procedure 120 can be started to merge or combine the main data storage 118 and the temporary data storage 124 into a single storage.

Figure 1B:
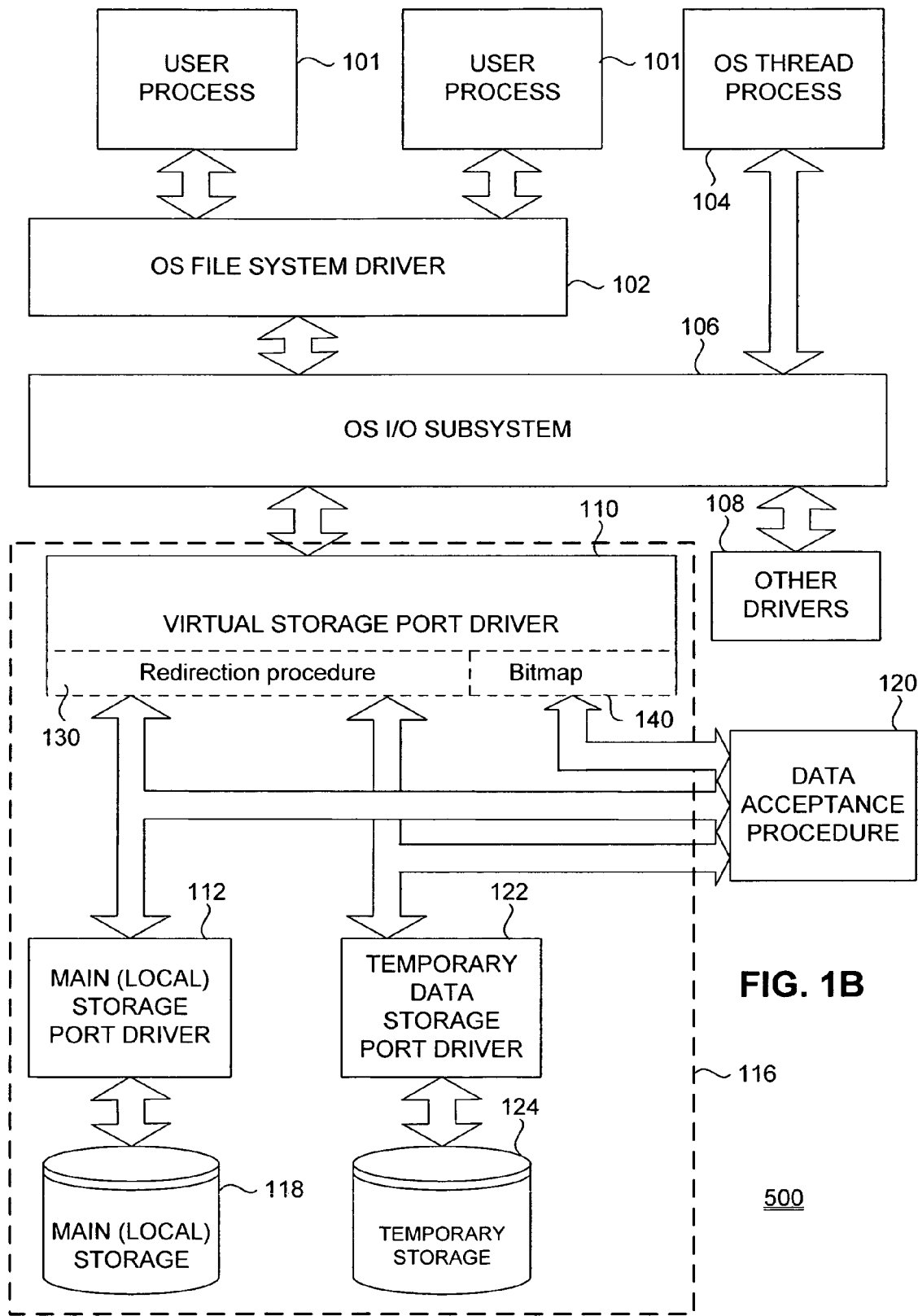
FIG. 1B illustrates an example of a data processing model during the process of accepting modified data.

FIG. 1B also shows a data processing diagram in a computing system 500 that is in the process of accepting changes generated during the data protection mode. The main difference between the system in the data protection mode and in the data acceptance mode is that a data acceptance procedure 120 is added to (or activated in) the operating system. Also, the main data storage 118 can become available for random access.

The data acceptance procedure 120 can be implemented as a background process. The data acceptance procedure 120 restores blocks of the temporary data storage 124 in corresponding blocks of the main data storage 118 and/or modifies FAT of the main data storage 118 in correspondence with addresses of corresponding blocks of the temporary data storage 124. It aggregates (merges) blocks of the temporary data storage 124 with the main data storage 118 either by restoring blocks or by updating FAT, in correspondence with the bitmap 140, that may be commonly accessed and modified by data acceptance procedure 120 and virtual storage driver 110. In some embodiments, blocks of the temporary data storage 124 reflected in the FAT of the main data storage 118 are unmarked.

Though the data acceptance procedure 120 (which can also be called a "data transfer procedure") is shown as an independent module, it runs in connection with the virtual storage port driver 110, and provides correct access to the virtual storage 116 by user processes 101 and OS thread processes 104. For instance, the bitmap 140 and redirection identifiers (links) can be used by both virtual storage port driver 110 and by the data transfer procedure 120.

Note that frequently, the main data storage 118 is physically local to the computing system 500, although, with modern networking technology, this need not be the case. Also, temporary data storage 124 can be physically local, physically remote, or distributed (such as in the form of a storage area network).

There are at least two methods to implement the data acceptance procedure 120 (or a combination of the two methods can also be done):

In one approach, the data blocks from the temporary data storage 124 can be transferred from the temporary data storage 124 to the main data storage 118 in a background manner. Simultaneously, corresponding blocks are unmarked in the bitmap 140. Furthermore, the virtual storage port driver 110 intercepts the only read requests directed to those blocks stored in the temporary data storage 124, which are marked. All other write or read requests are directed (or passed through) to the main data storage 118.

The second approach involves modifying file records in the FAT in correspondence with physical addresses of blocks of temporary data storage 124 in such a manner that blocks of the temporary data storage 124 are treated, going forward, as blocks of the main data storage 118. The first approach can be used for different physical structures containing main data storage 118 and the temporary data storage 124, and for files or other logical structures that contains unmoved blocks. The second approach can be used if the temporary data storage 124 occupies a part of the same physical drive as the main data storage 118. These two approaches, or any other approaches available, may be used concurrently.

In the above approaches, the data acceptance procedure 120 is used in conjunction with virtual storage port driver 110. All these utilities bring the main data storage 118 in correspondence with the virtual storage 116, so that all meaningful data stored in the temporary data storage 124 is reflected in the main data storage 118. Generally, the data acceptance procedure 120 "reduces" temporary data storage 124 area simultaneously with reflecting changes in the bitmap 140. The manner of doing it is chosen as described above.

In one embodiment, from the point in time when starting acceptance all the changes begins, the data acceptance procedure 120 starts, and the temporary data storage 124 or a part of it is used as the read-only portion of the virtual storage 116. The main data storage 118 is used as a random access storage. From this moment forward, all the write requests directed to the temporary data storage 124 blocks are passed to the main data storage 118 simultaneously with unmarking those blocks in the bitmap 140. Such an algorithm improves the speed of accepting data blocks, since some blocks should not be copied from the temporary data storage 124 to the main data storage 118 at all. In other words, updated blocks can be written to the real location together with reflecting changes in the bitmap 140 so it accelerate the process of accepting data in the background.

After finishing the data acceptance procedure 120, the virtual storage port driver 110 can be removed from the system.

The above aspect permits identifying certain common implementation approaches to data handling. The first is the use of temporary data storage 124 for storing information that is being modified, with the possibility of multiple changes of data of a single block (for example, representing a cluster).

Another approach is, in effect, a protection mechanism similar to the on-line backup, where every change to a data block is reflected in a separate area of the temporary data storage 124. At the end of the work session, or during the work session, the temporary data storage 124 has both valid and "rewritten" blocks that do not actually represent the main data storage 118 at a current point in time. If correspondence of blocks of the temporary data storage 124 is required, it can be implemented as part of the data acceptance procedure 120 in any point in time, e.g., only some blocks that are older that some set time are accepted, while other blocks of the temporary data storage 124 are ignored.

Correspondence of blocks of the temporary data storage 124 to blocks of the virtual storage 116 can be achieved in a number of ways. For example, a look-up table may be created for the bitmap 140, where locations of blocks in the temporary data storage 124 correspond to bits in the bitmap 140. This approach leads to a reduction in required memory resources. Another method is using stubs or links in file descriptors blocks stored in the temporary data storage 124 for indicating corresponding blocks of files of the temporary data storage 124.

Alternatively, the temporary data storage 124 can be a pre-assigned area on some drive corresponding to the source of the image 116. Blocks of the temporary data storage 124 become accessible to the user applications only when they have been marked in the bitmap 140. Such an approach leads to wasting some memory resources that are unused during editing of data, but significantly speeds up data processing.

Further, the temporary data storage 124 can be created in the format of incremental backups. Such increments may be created in an "on-line" mode, such as described in co-pending application Ser. No. 10/925,928, which is incorporated herein by reference.

It should be noted that further running of the disk drive required restoration procedure that required a minimal downtime as it is a background process. Furthermore if the main data storage 118 and the temporary data storage 124 share the same drive or partition, it may be possible to accept temporary data storage 124 blocks by rewriting corresponding blocks of the FAT. Thus, some blocks of the temporary data storage 124 do not be restored by copying.

Figure 2:
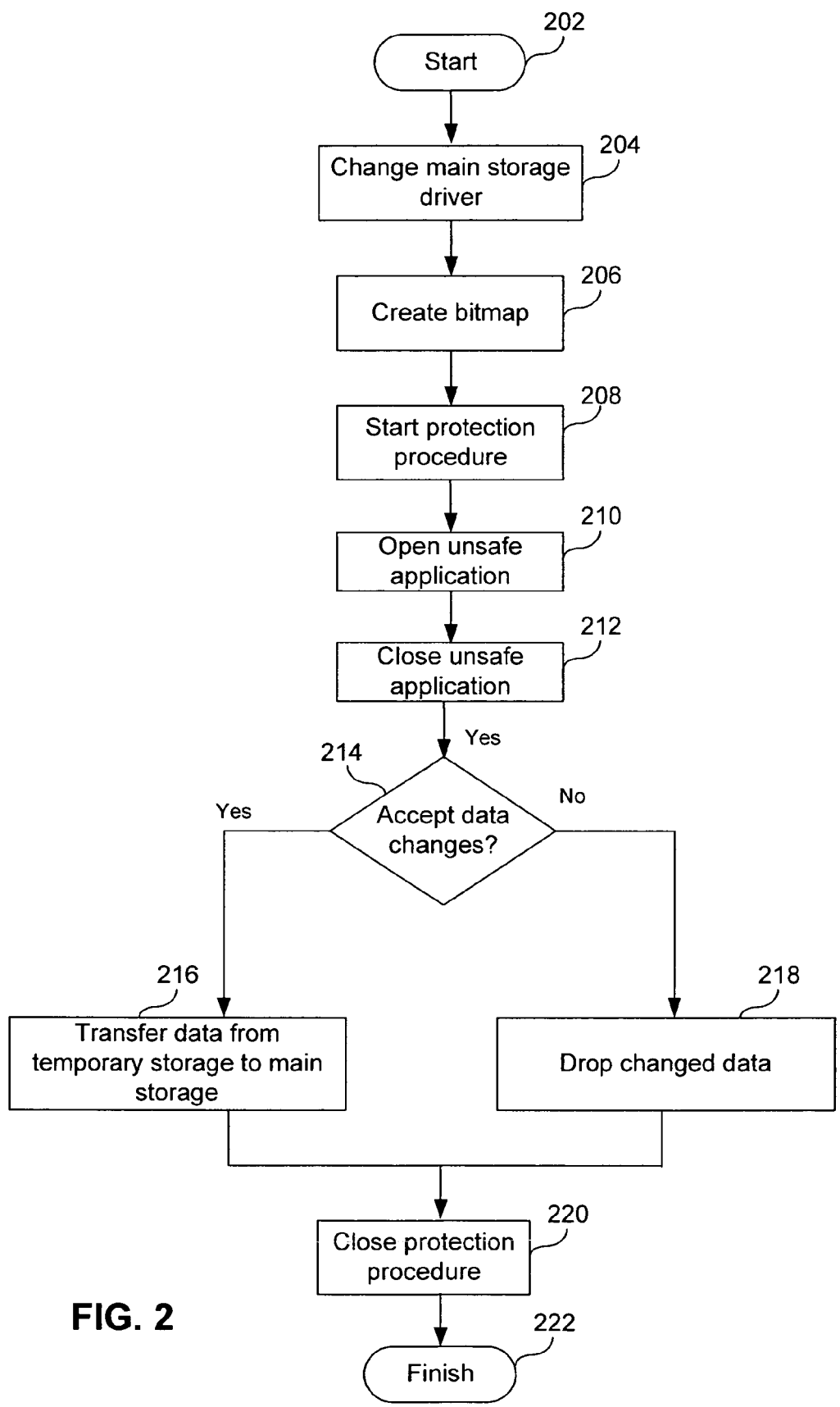
FIG. 2 illustrates the basic process of applying changes stored to data, according to one embodiment of the present invention.

It is also possible to reflect any changes in any point of time from starting protection procedure. In this case, all the write operations are directed to new blocks, so that it may be possible to restore data only for those blocks of some predefined point of time. In this case, the restore point can be defined dynamically and all the changes before the restore point are restored to the main drive FIG. 2 illustrates a basic procedure according to the method described herein. As shown in FIG. 2, the data protection mode starts in step 202 (for example, while booting up, or by a user's request, before starting an unsafe or potentially unsafe application).

In step 204, the main data storage 118 driver has been changed, so as to implement the redirection procedure 130 (see FIG. 1A). The redirection procedure 130 can be implemented either by fully substituting the main data storage 118 driver or by updating the main data storage 118 driver with the added redirection procedure 130, or by a filter that redirects I/O requests either to the protected area of the main data storage 118 or to the temporary data storage 124. The main data storage 118, such as the hard disk drive normally used by the user applications 101, is substituted by the virtual data storage 116 and stays visible to the operating system as a consistent storage area.

At this point, all the READ and WRITE requests to the main data storage 118 will be handled using the dedicated driver 110 for virtual storage 116.

Also, the bitmap 140 is created (step 206). The bitmap 140 reflects the blocks of the main data storage 118 that should be handled during the procedure with redirection to the temporary data storage 124 blocks. Generally, the bitmap 140 initially reflects "used" bocks of the main data storage 118 as unmarked, since there is no purpose in redirection those blocks to the temporary data storage 124 area until blocks are modified. Used blocks also can be blocks of the OS area. Also, blocks of deleted files, or all the blocks of the disk, may be marked.

In another embodiment, the bitmap 140 initially contains no block identifiers, and such identifiers are added to the bitmap 140 during the process of creating the blocks in the temporary data storage 124. In other words, all the blocks of the main data storage 118 that are not reflected in the bitmap 140 remain unmarked. After an attempt to modify a block in the protected area of the main drive 118 occurs, a corresponding block is assigned to the temporary data storage 124 and data is written to the modified block. Also, a record that identifies the block in the main data storage is added to the bitmap 140 and the block remains marked. Such a record can identify not only the block of the main data storage 118, e.g., the block's address, but also a corresponding block of the temporary data storage 124. In the latter case, blocks can be assigned to the temporary data storage 124 dynamically, as needed. Some mechanism should be used to identify correspondence between a block of the temporary data storage 124 and a block of the main data storage 118. Links or stubs or a lookup table may be used to provide such a correspondence. Also, the links can be used as a part of the bitmap 140.

In one embodiment, the bitmap 140 can include only identifiers of marked blocks, since "unmarking" of the block means removing corresponding identifier from the bitmap 140. In another embodiment, all the blocks of the main data storage 118 can be reflected in the bitmap 140 using corresponding "flags" or bits.

After starting the process of data protection (or during the data protection mode), virtual storage 116 is mounted and the main storage driver 112 is replaced (or modified, or updated or changed) (step 204). As shown above, the virtual storage 116 combines a read-only area of the main data storage 118 and the random access temporary data storage 124, to represent storage identified by the OS and, therefore, by the user applications, as a random access integral storage structure, like a disk drive, a drive partition, a folder with subfolders, etc.

In step 206, the bitmap 140 is created to identify units (e.g. blocks or clusters) of the main data storage 118 that are subjects of the modifications during user applications' execution. Therefore, the bitmap 140 should reflect that the corresponding unit is subject to modification. Such units may be blocks, clusters, or other storage sub-units in the main data storage 118 that are subject to the modification. Commonly, such a unit is a lowest-level accessible block.

In step 208, the data protection procedure is started, for example, in response to a user activating an on-screen icon. In step 210, an unsafe application or some other code that may cause system failure may be started.

In step 212, unsafe applications are closed or terminated. In other words, at some point in time, there is no purpose in protecting data either by accepting changes or by rejecting changes, e.g., due to a fault of the computing system 500. In step 214, the user estimates the ability to accept the data stored in the temporary data storage 124. It should be noted that estimation is possible at any point in time, and not only during normal operation of the computing system 500, but also after restarting or rebooting of the computing system 500 after a system failure. Since all the modified data, along with the bitmap 140 data, can be stored in a nonvolatile memory, accepting changes may be possible after restarting the system.

After step 214, the process of accepting data may be started, in step 216, or the process of dropping changes 218 may be performed.

Dropping the changes can be done while the data transfer procedure 120 is active, e.g., by resetting the bitmap 140. Also, dropping changes may be done by deactivating the data protection procedure. Also, dropping the changes may be performing by normal rebooting of the system without the data protection utilities, such that all the changes have no effect after rebooting.

In step 220, after either accepting the changes or dropping the changes, the data protection procedure may be closed. Note that dropping the changes and closing the data protection procedure 120 may be a single operation as it is shown earlier. Also, such an operation may be performed simultaneously with an emergency shutdown of the system, if the emergency shutdown is initiated by the unsafe application.

In step 222, the process is terminated.

Since input/output operations relating to storage devices are performed, it may be useful to explain data processing on an example of the input/output request packets (IRPs). In the Windows operating systems, an input/output request packet (IRP) is a request to the OS kernel to perform some action relating to the storage device, such as a WRITE to or a READ from the storage device. Note that IRPs sometimes go by other names (depending on the hardware and operating system involved), but, in general, perform the above function. In this discussion, IRPs directed to reading or writing data from/to the storage device are primarily at issue. Other IRPs, such as control IRPs or drive condition requests are treated as they would be treated in normal OS operation mode. In other words, such IRPs are passed to low level drivers, e.g., to temporary data storage port driver 122 or to the driver of whichever storage device where the archive is physically stored. Detailed discussion of such IRPs is outside the scope of this invention.

Figure 3:
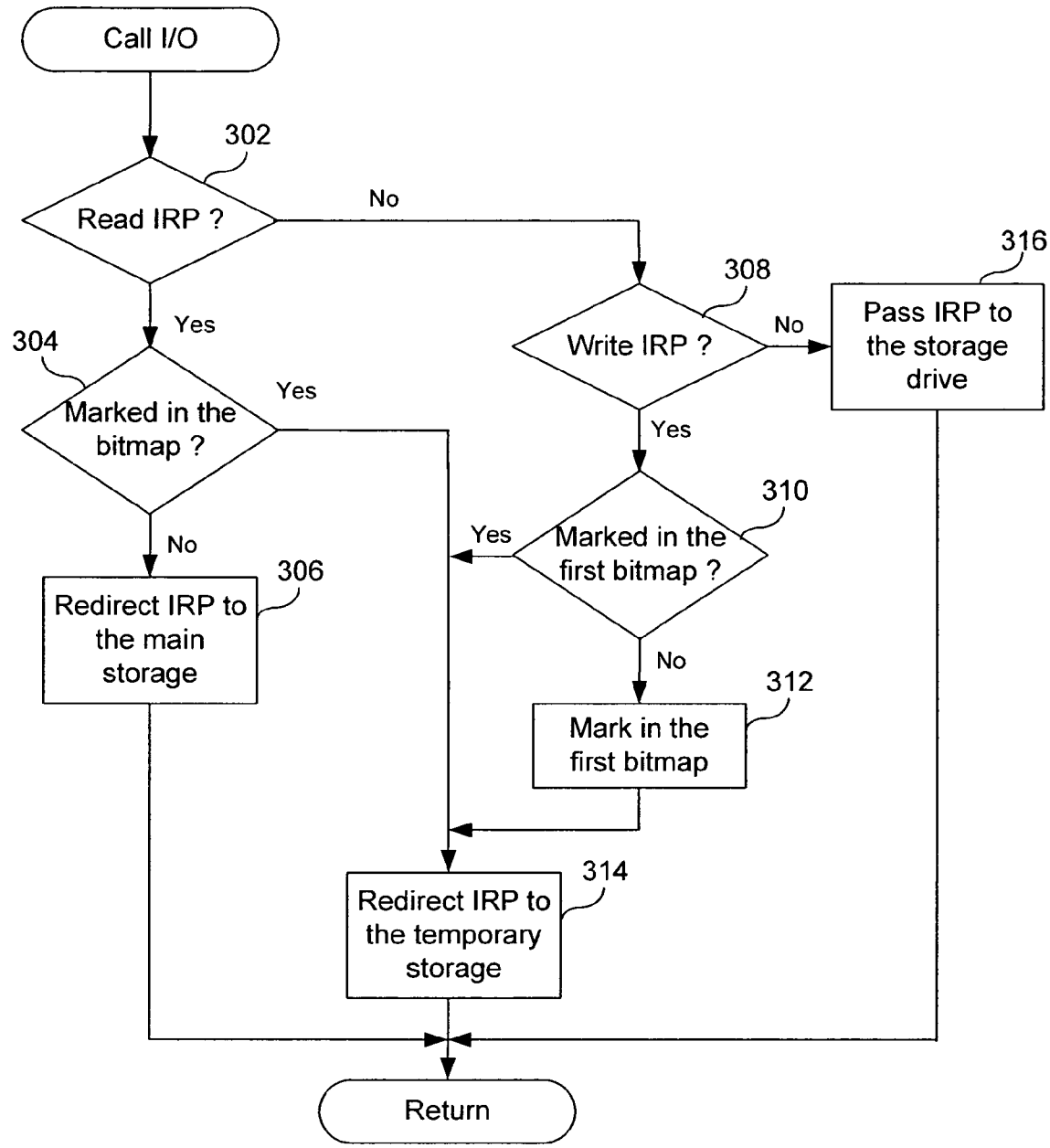
FIG. 3 illustrates the process of handling IRPs in the present invention.

FIG. 3 illustrates the process of handling IRPs. FIG. 3 also describes how virtual storage 116 fits into the overall protection scheme. As shown in FIG. 3, the process stays in a waiting mode 302 when no IRPs are generated by system utilities or by a user application. After receiving an IRP directed to the virtual storage, in step 302, the process first checks if the IRP is a READ IRP. If it is a READ IRP, then, in step 304 the process checks if the particular storage unit is marked in the bitmap 140 (which indicates which blocks (e.g., a cluster) of the virtual storage 116 was modified and corresponding modified data is stored in the temporary data storage 124). If the answer is no, then the IRP is redirected to the main data storage 118 in step 306. The process then returns back to step 302. If, in step 304, the storage unit is recognized as marked in the first bitmap 140, then the access request is redirected to the temporary data storage 124 in step 314. The process then returns to step 302.

If, in step 302, the IRP is not a READ IRP, then the process checks if the IRP is a WRITE IRP (step 308). If it is not a WRITE IRE, then, in step 316, the IRP is passed to the underlying physical drive, and the process returns to step 302. Note that the main data storage 118 and temporary data storage 124 can all "live" on the same physical drive, either as an entire drive, or as files or folders. Thus, other IRPs are passed to any preassigned physical storage.

If, in step 308, the IRP is a WRITE IRP, then the process checks if the storage unit is marked in the first bitmap 140 (step 310). If it is, then the process proceeds to step 314, as described above. If it is not, then the storage unit is marked in the bitmap 140 (step 312) and the process proceeds to step 314, and data is written to the corresponding block of the temporary data storage 124.

In other words, all attempts to WRITE to the main data storage 118 are redirected to the temporary data storage 124. The system itself does not "know" that the storage it is accessing is the temporary data storage 124, rather than its actual (main) storage 118. At some point in time, the data that is stored in the temporary data storage 124 is then transferred to the main data storage 118, effecting accepting data.

FIG. 4 describes the process (120) of accepting data stored in the temporary data storage 124. As shown in FIG. 4, in step 402, the process checks if there any block in the bitmap 140 marked. If the answer is "no" then the temporary storage area is empty and accepting process is finished. If the answer is "yes," some blocks requires copying from the temporary data storage 124 to the corresponding area on the main data storage 118. In the latter case, the data is read from the temporary data storage 124 (step 404). Data is then written to the main data storage 118 (step 406). The appropriate bits are unmarked or reset in the bitmap 140 (step 408).

If the user decides to restore the main data storage 118 to its previous state, then, in step 218, the bitmap 140 is reset. Then virtual storage port driver 110 is removed from the system (or deactivated). After that the main storage is restored and may be used without protection procedure.

Another mechanism contemplated by the present method may be implemented when the temporary data storage 124 and the protected area share the same drive or drive partition. The mechanism includes protecting used blocks of the main drive, and writing some blocks to the temporary data storage 124 without marking in the bitmap 140.

Since commonly the change in a file is done by writing the file to a new area, the changes to the file might only require creating links to the changed blocks of the FAT stored in the temporary data storage 124, while blocks (clusters) of the file may be written to the locations of the temporary data storage 124 already indicated in the changed FAT, and can be used as-is, without a need for creating additional links and, in some cases, bits in the bitmap 140. Also, in this case, there is no point in marking blocks of the file in the bitmap 140, since these blocks should not be copied while accepting changes and should not be write-protected.

Since there is no need, in this case, for a separate redirection procedure for blocks of newly created files (as well for replaced files), as another option, the changes can be accepted by merging the FATs.

An example of the computing system 500 is illustrated in FIG. 5. The computing system 500 includes one or more processors, such as processor 501. The processor 501 is connected to a communication infrastructure 506, such as a bus or network. Various software implementations are described in terms of this exemplary computer system. After reading this description, it will become apparent to a person skilled in the relevant art how to implement the invention using other computer systems and/or computer architectures.

Computing system 500 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, or other storage medium that is READ by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computing system 500. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to server 102.

Computing system 500 may also include one or more communications interfaces, such as communications interface 524. Communications interface 524 allows software and data to be transferred between computing system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 501. Information representing processed packets can also be sent in the form of signals 528 from processor 501 through communications path 526.

The terms "computer program medium" and "computer usable medium" are used to generally refer to media such as removable storage units 518 and 522, a hard disk installed in hard disk drive 512, and signals 528, which provide software to the computing system 500.

Computer programs are stored in main memory 508 and/or secondary memory 510. Computer programs may also be received via communications interface 524. Such computer programs, when executed, enable the computing system 500 to implement the present invention as discussed herein. In particular, the computer programs, when executed, enable the processor 501 to implement the present invention. Where the invention is implemented using software, the software may be stored in a computer program product and loaded into computing system 500 using removable storage drive 514, hard drive 512 or communications interface 524.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for data protection comprising:
   (a) mounting a virtual storage that combines a full access temporary storage and a local READ-only portion of a main storage, wherein the READ-only portion represents a protected area of the main storage that is frozen during a backup process, and wherein the temporary storage is initially empty and is written to incrementally;
   (b) generating a bitmap for blocks of the virtual storage;
   (c) redirecting virtual storage write requests to the temporary storage, wherein the redirection is performed on a block level, and providing an on-screen indicator, to the user, of the redirecting;
   (d) marking, in the bitmap, blocks of the virtual storage corresponding to blocks of the temporary storage that are being written to;
   (e) redirecting, to the READ-only portion, read requests for unmarked blocks;
   (f) redirecting, to the temporary storage, read requests for marked blocks;
   (g) upon an acceptance of a state of the virtual storage, merging the temporary storage with unmarked blocks of the READ-only portion of the main storage, to form an integral storage; and
   (h) upon a rejection of a state of the virtual storage, terminating the redirecting,
   wherein an initial state of the main storage is used by multiple operating systems.

2. The method of claim 1, wherein step (g) comprises copying marked blocks from the temporary storage to the main storage and unmarking corresponding blocks in the bitmap.

3. The method of claim 1, further comprising creating a plurality of virtual storages, all of which use the same READ-only portion.

4. The method of claim 1, wherein blocks of temporary storage are "write-once-read-many times" blocks.

5. The method of claim 1, further comprising creating the temporary storage on any of a hard disk drive, an optical drive, a tape and a network storage element.

6. The method of claim 1, further comprising assigning free blocks of the main storage as blocks of the temporary storage.

7. The method of claim 1, wherein the main storage and the temporary storage are located on the same computer system.

8. A method for protection of contents of a main storage, the method comprising:
   (a) modifying, in an operating system, a main storage driver to act as a virtual storage driver, wherein the virtual storage driver redirects virtual storage access requests to one of the local main storage that is frozen during a backup process and a temporary storage and wherein the temporary storage is initially empty and is written to incrementally;
   (b) generating a bitmap for blocks of the virtual storage, and redirecting, to the temporary storage, write requests, wherein the redirection is performed on a block level based on the bitmap, and providing an on-screen indicator, to the user, of the redirecting;
   (c) redirecting read requests directed to modified blocks of the virtual storage to corresponding blocks of the temporary storage;
   (d) upon an acceptance of a state of the virtual storage, merging temporary storage to the main storage; and
   (e) upon a rejection of a state of the virtual storage, terminating read and write requests redirection.

9. The method of claim 8,
   wherein the bitmap identifies blocks of the main storage subject to modification; and further comprising
   redirecting read requests directed to the blocks indicated in the bitmap as corresponding to blocks of the temporary storage.

10. The method of claim 8, wherein step (d) comprises copying marked blocks of the temporary storage to corresponding blocks of the main storage.

11. The method of claim 10, wherein the copying is a background process.

12. The method of claim 8, wherein step (e) further comprising at least partially removing the virtual storage driver.

13. The method of claim 8, further comprising hiding the temporary storage from the operating system.

14. The method of claim 8, wherein the main storage and the temporary storage share partitions of the same physical storage drive.

15. The method of claim 8, wherein free blocks of a physical storage drive are used as blocks of the temporary storage.

16. The method of claim 8, wherein used blocks of the physical storage drive are used as the main storage.

17. The method of claim 8, wherein blocks are assigned to the temporary storage in succession.

18. The method of claim 8, wherein the virtual storage represents a partition of the disk drive, and wherein blocks of the temporary storage are recognized by the operating system as read-only blocks.

19. The method of claim 8, wherein the temporary storage is implemented as any of a RAM, a DVD-ROM, a flash disk, a disk partition, a distributed storage, a network drive, and a hard disk drive.

20. The method of claim 8, wherein blocks of temporary storage are "write-once-read-many times" blocks.

21. A system for data protection comprising:
   (a) a virtual storage that combines a full access temporary storage and a local READ-only portion of a main storage, wherein the READ-only portion represents a protected area of the main storage that is frozen during a backup process, and wherein the temporary storage is initially empty and is written to incrementally;
   (b) a bitmap representing blocks of the virtual storage, wherein blocks of the virtual storage corresponding to blocks of the temporary storage that are being written to are marked in the bitmap;
   (c) a virtual storage driver that redirects virtual storage write requests to the temporary storage, wherein the redirection is performed on a block level, and providing an indicator, to the user, of the redirecting, redirects to the READ-only portion read requests for unmarked blocks, and redirects to the temporary storage read requests for marked blocks;
   (d) wherein, upon an acceptance of a state of the virtual storage, the temporary storage is merged with unmarked blocks of the READ-only portion of the main storage, to form an integral storage; and
   (e) wherein, upon a rejection of a state of the virtual storage, the redirecting is terminated, and
   (f) wherein an initial state of the main storage is used by multiple operating systems.

22. The system of claim 21, wherein the main storage and the executable for implementing the functionality of the system are located on the same physical computer system.

23. A computer program product for data protection, the computer program product comprising a computer useable storage medium having computer program logic recorded thereon that controls at least one processor, the computer program logic comprising:

(a) computer program code means that mounts a virtual storage that combines a full access temporary storage and a local READ-only portion of a main storage, wherein the READ-only portion represents a protected area of the main storage that is frozen during a backup process, and wherein the temporary storage is initially empty and is written to incrementally;

(b) computer program code means that generates a bitmap for blocks of the virtual storage;

(c) computer program code means that redirects virtual storage write requests to the temporary storage, wherein the redirection is performed on a block level, and providing an on-screen indicator, to the user, of the redirecting;

(d) computer program code means that marks, in the bitmap, blocks of the virtual storage corresponding to blocks of the temporary storage that are being written to;

(e) computer program code means that redirects, to the READ-only portion, read requests for unmarked blocks;

(f) computer program code means that redirects, to the temporary storage, read requests for marked blocks;

(g) computer program code means that, upon an acceptance of a state of the virtual storage, merges the temporary storage with unmarked blocks of the READ-only portion of the main storage, to form an integral storage; and (h) computer program code means that, upon a rejection of a state of the virtual storage, terminates the redirecting.

* * * * *